(12) United States Patent
Pathak et al.

(10) Patent No.: US 7,627,873 B1
(45) Date of Patent: *Dec. 1, 2009

(54) SYSTEM AND METHOD FOR HANDLING DEVICE OBJECTS IN A DATA STORAGE ENVIRONMENT FOR MAINTAINING CONSISTENCY DURING DATA REPLICATION

(75) Inventors: Saurabh M. Pathak, Chapel Hill, NC (US); David Haase, Fuquay Varina, NC (US); Michael D. Haynes, Raleigh, NC (US); Somnath A. Gulve, Morrisville, NC (US); Dennis Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 759 days.

This patent is subject to a terminal disclaimer.

(21) Appl. No.: 11/324,461

(22) Filed: Jan. 3, 2006

(51) Int. Cl.
*G06F 9/54* (2006.01)
*G06F 12/00* (2006.01)

(52) U.S. Cl. .................................. 719/321; 711/162
(58) Field of Classification Search .................. None
See application file for complete search history.

(56) References Cited

U.S. PATENT DOCUMENTS 7,509,465 B1 * 3/2009 Misra et al. ................. 711/162

* cited by examiner

*Primary Examiner*—Gary J Portka
(74) *Attorney, Agent, or Firm*—Krishnendu Gupta; Robert Kevin Perkins

(57) ABSTRACT

A system and method related to maintaining consistency of replicated data in a data storage environment. The system handles Input/Output (IO)-Requests in a data storage environment having a server and production data stored on a data storage volume on a data storage system. A copy of the production data is stored on another data storage volume of a second data storage system, wherein IO-Requests to update production data are handled so that the data copy is consistent with the production data after processing the IO-Request.

17 Claims, 8 Drawing Sheets

MULTIPLE OBJECT MODEL

MULTIPLE OBJECT MODEL

US 7,627,873 B1

SYSTEM AND METHOD FOR HANDLING DEVICE OBJECTS IN A DATA STORAGE ENVIRONMENT FOR MAINTAINING CONSISTENCY DURING DATA REPLICATION

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This application generally relates to data storage management, and more particularly to management related to copying or replication of data in a data storage environment

RELATED APPLICATION

This U.S. Patent application is related to an application with S/N (to be determined) entitled "Architecture and Apparatus for Handling Device Objects in a Data Storage Environment for Maintaining Consistency During Data Replication" being filed on even date to inventor Pathak et al. and assigned to EMC Corporation of Hopkinton, the same assignee as this application.

BACKGROUND

Computer systems may include different resources used by one or more host processors. Resources and host processors in a computer system may be interconnected by one or more communication connections. These resources may include, for example, data storage systems, such as the Symmetrix™ or CLARiiON™ (also referred to herein as Clariion) family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system IO operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

It is known that is desirable to copy or replicate data, including for a backup operation. Once data is replicated, copied, or otherwise backed up it may be used for a recovery or restoration process, wherein the copy of the data is restored back onto the source. This may be done for a variety of reasons including failures. So for example, data may be restored from the last good copy. The inventor of the present invention discussed below have critically recognized that it would be advantageous to avoid corruption of data during a replication process so that such a restoration or recovery will be successful.

SUMMARY

To overcome the problems of the prior art mentioned above and to provide advantages also described above, this invention is a system and method for handling server Input/Output (IO) requests to the production data so that the data copy is consistent with the production data after processing the IO-Request. The methods operates in a data storage environment having a server, a first and second data storage volume, and production data being stored on the first data storage volume on a first data storage system, and a copy of the data denominated as the data copy being stored on the second data storage volume of a second data storage system. The method includes the steps of: (a) inserting on the first data storage system a first device object above a second device object and a third device object below the second device object to form a stack of layered device objects, wherein the first device object and the third device object are associated with a first device driver and the second device object is associated with a second device driver; (b) the first device driver passing an IO-Request for the production copy on the first data storage system to the first device object; (c) the second device object intercepting the first device object and transmitting the IO-Request associated with the first device object to the third device object and to a fourth device object on the second data storage system; (d) the fourth device object receiving and processing the associated IO-Request for the data copy on the second data storage system; and (e) the third device object receiving and processing the associated IO-Request for the production copy on the first data storage system such that when each IO-Request is processed the data on the data copy and the production data are consistent.

In another embodiment, a method operates in a data storage environment having a server, a first and second data storage volume, and production data being stored on the first data storage volume, and a copy of the data denominated as the data copy being stored on the second data storage volume. The method includes the steps of:

(a) inserting on the first data storage system a first device object above a second device object and a third device object below the second device object to form a stack of layered device objects, wherein the first device object and the third device object are associated with a first device driver and the second device object is associated with a second device driver; (b) the second device driver passing an IO-Request for updating the data copy to the second device object; (c) the third device object intercepting the second device object and transmitting the IO-Request associated with the second device object to the fourth device object; (d) the fourth device object receiving and the processing the associated IO-Request for the data copy on the second data storage volume; and (e) the third device object processing the associated IO-Request for the production copy such that when each IO-Request is processed the data on the data copy and the production data are consistent.

In another embodiment, the invention is implemented as steps in a process. In other embodiments, implementations include a system, a computer program product, or an apparatus, wherein each embodiment is configured for carrying out the steps involved in methodology embodiments.

BRIEF DESCRIPTION OF THE DRAWING

The above and further advantages of the present invention may be better under stood by referring to the following description taken into conjunction with the accompanying drawings in which.

DETAILED DESCRIPTION OF THE PREFERRED EMBODIMENTS

Introduction

Figure 1:
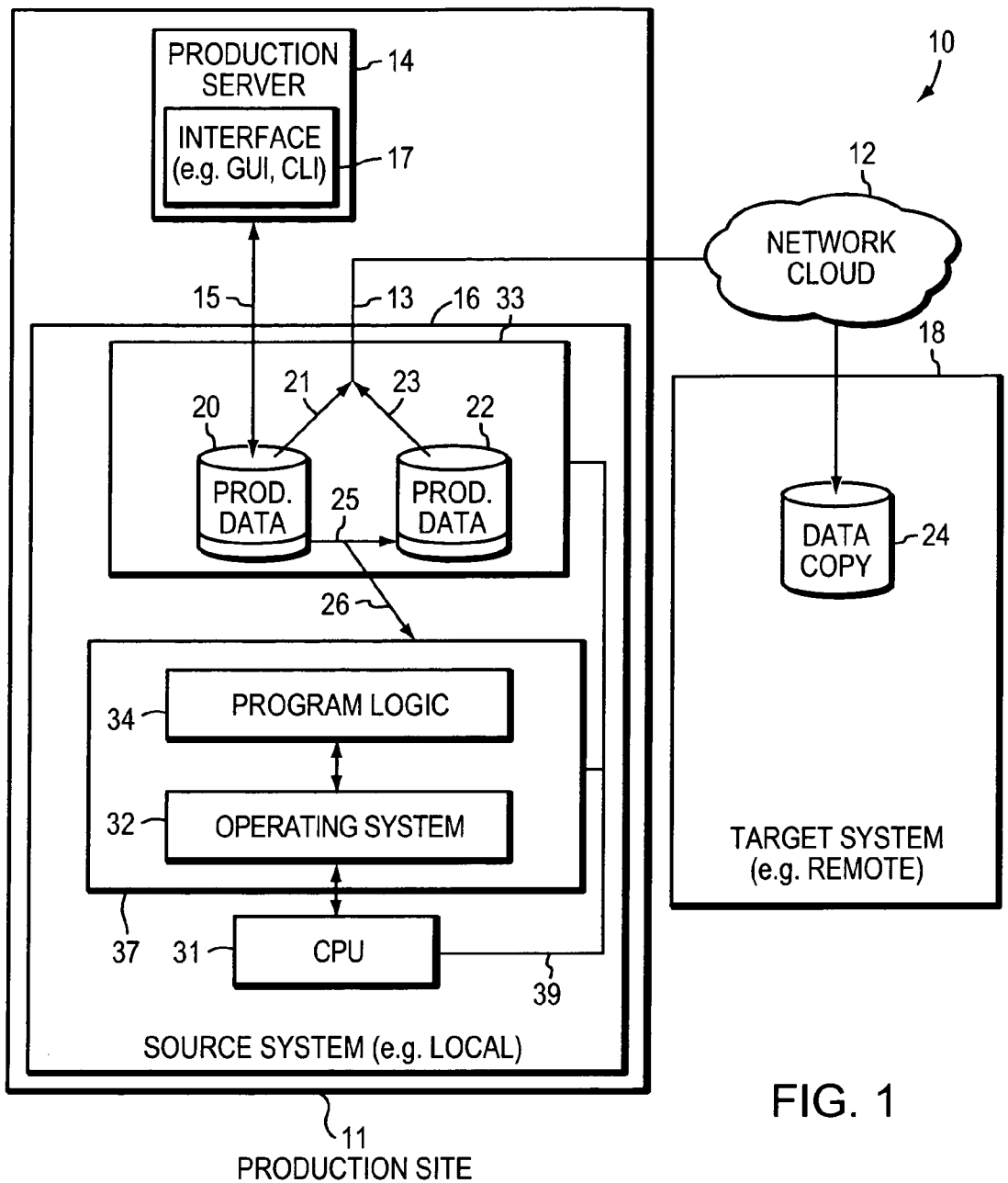
FIG. 1 shows a block diagram schematic of an embodiment of a data storage environment including at least one data storage system and including program logic for carrying out the method embodiments of the present invention.

In the preferred embodiment, the embodiment operates in cooperation and may be a part of computer software, operating the preferred EMC CLARiiON or Symmetrix storage systems available from EMC Corporation of Hopkinton, Mass., although one skilled in the art will recognize that the invention may be used with other data storage systems. In the preferred embodiment, EMC CLARiiON storage system implements aspects of the present invention as part of software that operates with such a storage system. In this preferred embodiment, a locally accessible mirror copy of a specified Logical Unit (LU), or logical mirror copy is available for backups or other host processes. The logical mirror copy may also be useful for operations that change data, such as production testing or data warehousing, without disrupting the production database.

In the preferred embodiment, the preferred invention operates in cooperation and may be a part of computer software, such EMC Corporation's MirrorView software on a preferred CLARiiON data storage system, and may use other CLARiiON software, including its disk management operating system, FLARE, and layered drivers, such as Mirrors and Clones. However, one skilled in the art will recognize more general applicability of the invention in view of the teachings herein and limits should only be imparted from the claims appearing below.

MirrorView is typically configured for allowing central management of movement of data between data storage systems, e.g. the preferred EMC CLARiiON and Symmetrix storage systems available from EMC Corporation of Hopkinton, Mass., although one skilled in the art will recognize that the invention may be used with other data storage systems. Preferably, Mirrorview is a storage-based implementation to remove impact from a server which may be hosting application software in a production environment.

Typically, Mirrorview operates in cooperation, with EMC's TimeFinder and local replication applications, eliminating the impact to production activities by using Business Continuance Volumes (BCV's) (discussed in the incorporated '497 patent referenced below) or Snapshots as source volumes so applications stay online throughout the data movement process. However, the present invention may be used without requirement of such BCV's or Snapshots. For the sake of completeness, operational features embodied in EMC's Timefinder and Symmetrix are described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

CLARiiON Layered Features are implemented as standard Microsoft Windows intermediate drivers. These intermediate drivers run in the IO stack and act on IO-Request packets (IRPs) received. By intercepting requests before they reach their intended target, these drivers can extend the functionality provided by FLARE, the preferred operating system of CLARiiON. Drivers must present a standard interface to drivers higher in the stack. Each participates in a device export/consumption model in which the layered driver consumes one or more device objects provided by lower level drivers and exports its own objects layered on top of the consumed objects. The inventor has critically recognized that in a prior art implementation each layered driver would export a single device object per device stack and such a model limits the flexibility and interoperability of the various layered features. Many of these restrictions are eliminated by allowing layered drivers to insert multiple device objects into strategic locations within a device stack by implementing the present invention.

Some terminology used herein is shown in here in Table 1:

TABLE 1

Source: Typically a logical unit (LU) from where data is mirrored or copied, and which herein is sometimes referred to as being cloned.
Clone: Another LU, other than the Source LU, but which is a copy of the specified Source.
Transmitter Object: A device object that is inserted into a device stack from which a layered driver initiates IO-Requests
Receiver Object: A device object that is inserted into a device stack from which a layered driver receives IO-Requests.
LU: Logical Unit Overview of a Preferred Embodiment In a preferred embodiment, Program Logic, which may be in one or more alternative embodiments, cooperates with and may include EMC MirrorView that performs copy operations to specified Production Data. One skilled in the art will recognize that the invention is not limited to such preferred embodiments; however, they are described herein as an example of implementing the invention.

A Preferred Embodiment Description

Referring to FIG. 1, Data Storage Environment 10 includes a Production Server 14 with an Interface 17, e.g., a graphical user interface (GUI) or command line interface (CLI) for communicating with Local Data Storage System 16 across path 15, and in particular for accessing Production Data 20, wherein Production Data Copy 22 is data replicated along copy path 25. The Production Data 20 is updated by write requests along path 15 in Server IO. For convenience, reference is made herein to a Production Site 11, which comprises the Production Server 14 and Local System 16.

The Data Storage System 16 may be considered a Source or Local system and replication, backup, or other copying may be performed to a Target or Remote system. The term remote as used herein means being on a different storage system, although this invention is applicable to source and target systems that actually are the same system but the data is sent to a different storage device or even a different location on the same storage device in the same system. For purposes of this invention it is sufficient to understand that the Remote System has storage devices (e.g. hard drives) that may function to duplicate or simulate some or all of the Local System on a volume-by-volume basis and that the volumes can by physical volumes, although logical volumes are preferred. Devices and volumes in a logical sense are also used interchangeably throughout, and sometimes are referred to as logical units. Note also that throughout this document, like symbols and identical numbers represent like- and identical elements in the Figures. With further regard to terminology, copying is used throughout to generally refer to any way of duplicating data that is stored in one storage location (e.g. Production Data on the Source or Local System) to another storage location (e.g. Data Copy on the Target or Remote System) for any reason including, replication, backup, restore, or general mirroring. Although the invention is particularly useful in an environment employing a local and remote data storage system, it will become apparent upon reading this specification that the invention is also useful in a local system itself using copying or replication to a local volume or logical unit. With that understanding, it should be appreciated by one skilled in the art that this invention is not to be limited except by the claims appearing below.

Figure 7:
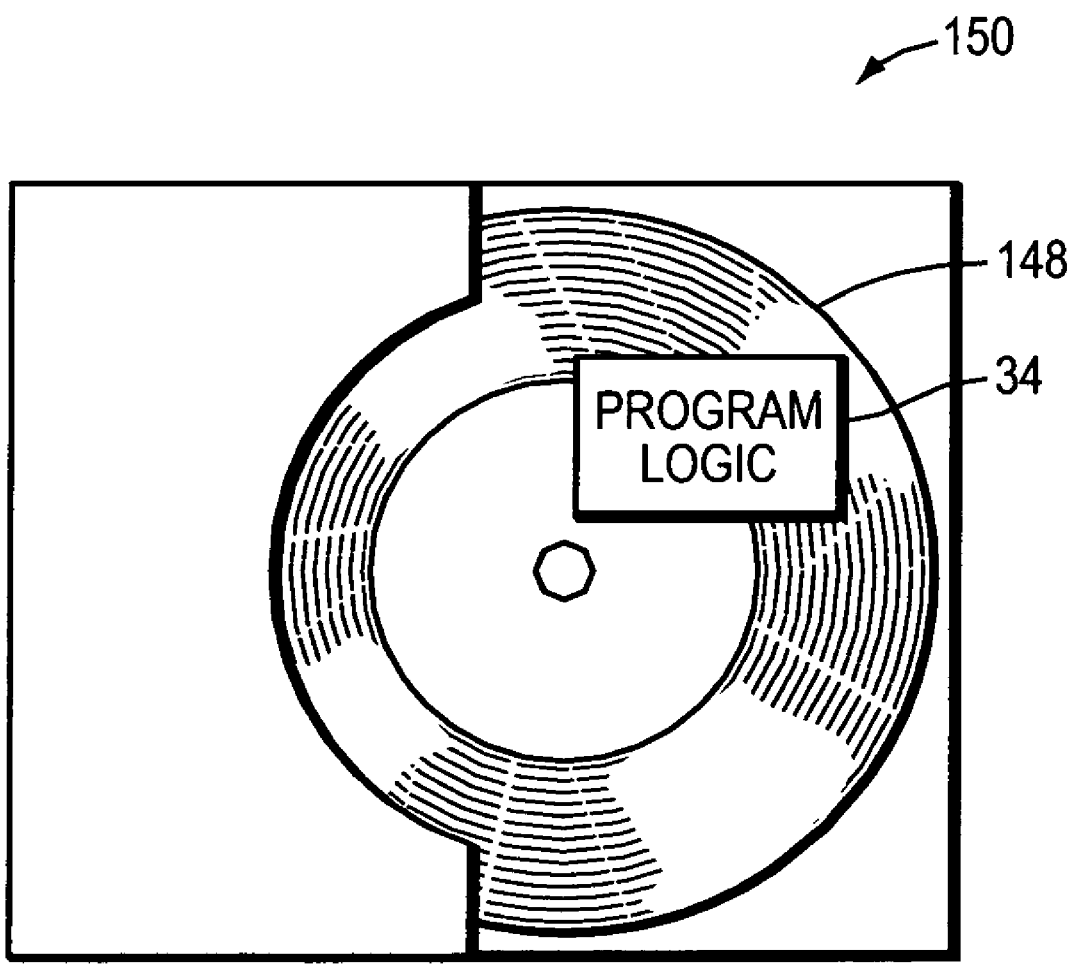
FIG. 7 shows a computer-readable medium including computer-executable code including the program logic for carrying out method steps of the method embodiments of the present invention.

Generally, in a preferred embodiment the Program Logic 34 acts in cooperation with the operating system 32, and the CPU 31 on the source data storage system 16. The bitmaps and Program logic operate in electronic memory 37 and when executed by CPU 31 over communication path 39 carry out method steps embodying the invention. It is preferred that the Program Logic be computer software although it is possible for it to be embodied in whole or part in hardware or firmware. Program Logic 34 may also be embodied on a computer program product 150 including a computer-readable medium 148 as shown in FIG. 7, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Referring again to FIG. 1, Production Data 20 and 22, as it pertains to this invention, is replicated over respective paths 21 and 23 by Program Logic 34 to Data Copy 24 on a Target or Remote Data Storage System or Storage Array 18, over path 13 to network cloud 12, which may be for example a wide area network.

Figure 2:
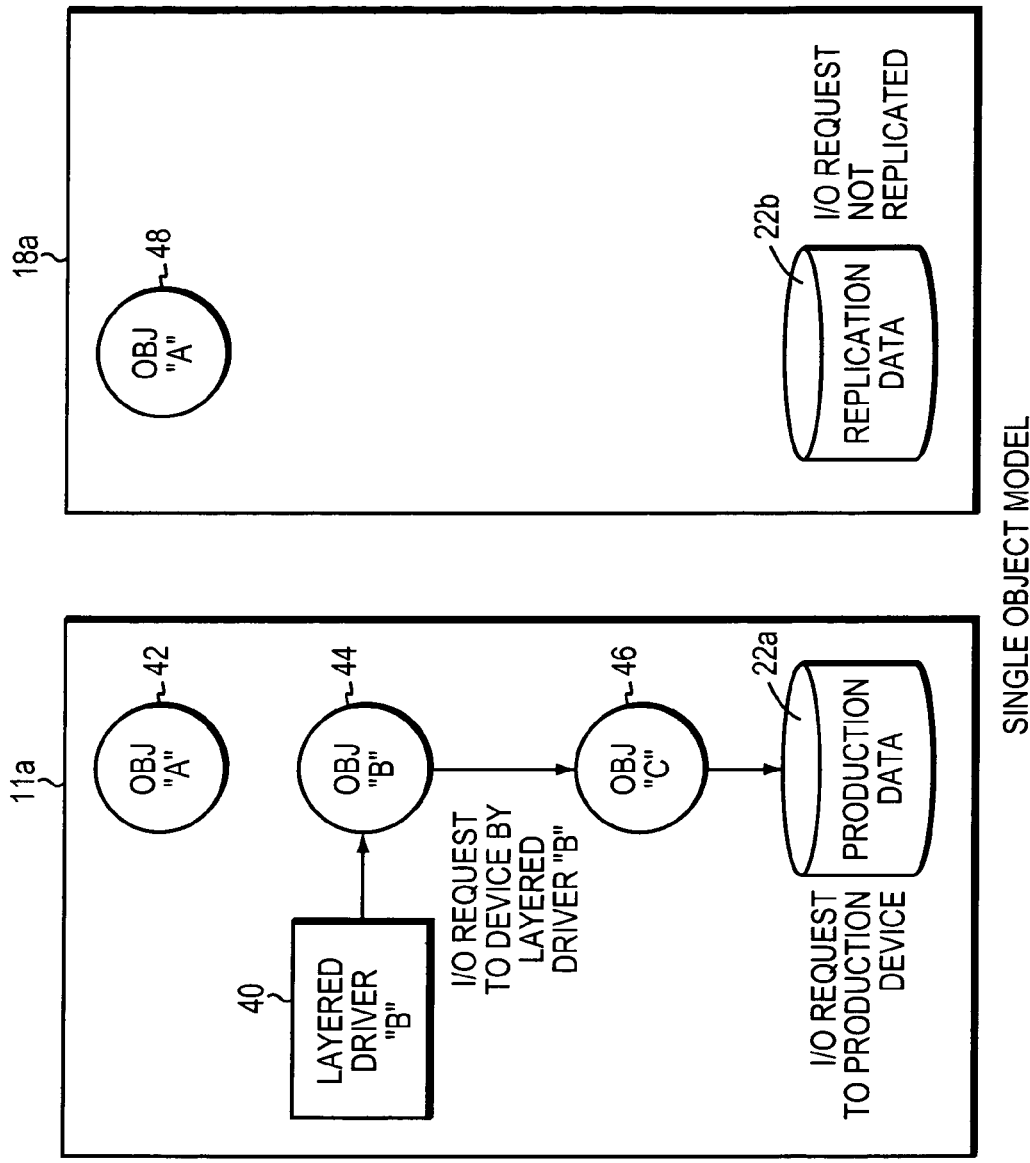
FIG. 2 shows a prior art schematic block diagram.

In a prior art configuration shown in FIG. 2, when a layered feature is applied to a device, the associated driver(s) insert a single Windows device object into the Windows IO device stack for the device. The location within the stack depends on a pre-defined ordering designed to allow the various layered features to work together.

This single device object and specific stack location model creates various problems when integrating layered features, particularly those that act as IO initiators (MirrorView and Clones). Once these IO initiators insert a device object within an IO device stack, the associated layered feature is able to send IO-Requests only to the device object below it in the stack (to the device object it is consuming). Many layered drivers need to track IO to a device in order to process the data. Because of this they need to be able to intercept all IO-Requests to the device. If a layered driver acting as an IO initiator sends an IO-Request down the device stack; all layered drivers with device objects above it will not be able to intercept the request. This may result in data corruption on a replication device.

Referring again to Prior Art FIG. 2, a problem is shown for which the invention is useful for overcoming, and for which the existence of is a critical recognition on the part of the inventive entity. IO initiator Layered Driver "B" 40 on source data storage system 11, in the example, is shown having inserted a device object 44 into the device stack below the device object "A" 42 of Layered Driver "A" (not shown) and being handled toward servicing an IO-Request to Product data storage device 22a. Because layered feature "B" is able to send IO-Requests only to the device object below it in the stack, such as object 44 and 46 these changes cannot be tracked by Layered Driver "A". This would result in a data corruption on the replication device being maintained by Layered Driver "A." I.e. the object 48 on data storage system 18a would not replicate the IO-Request by Layered Driver B and so the request would not be replicated to data storage device 22b. This is an undesirable condition that the inventor has critically recognized.

Figure 3:
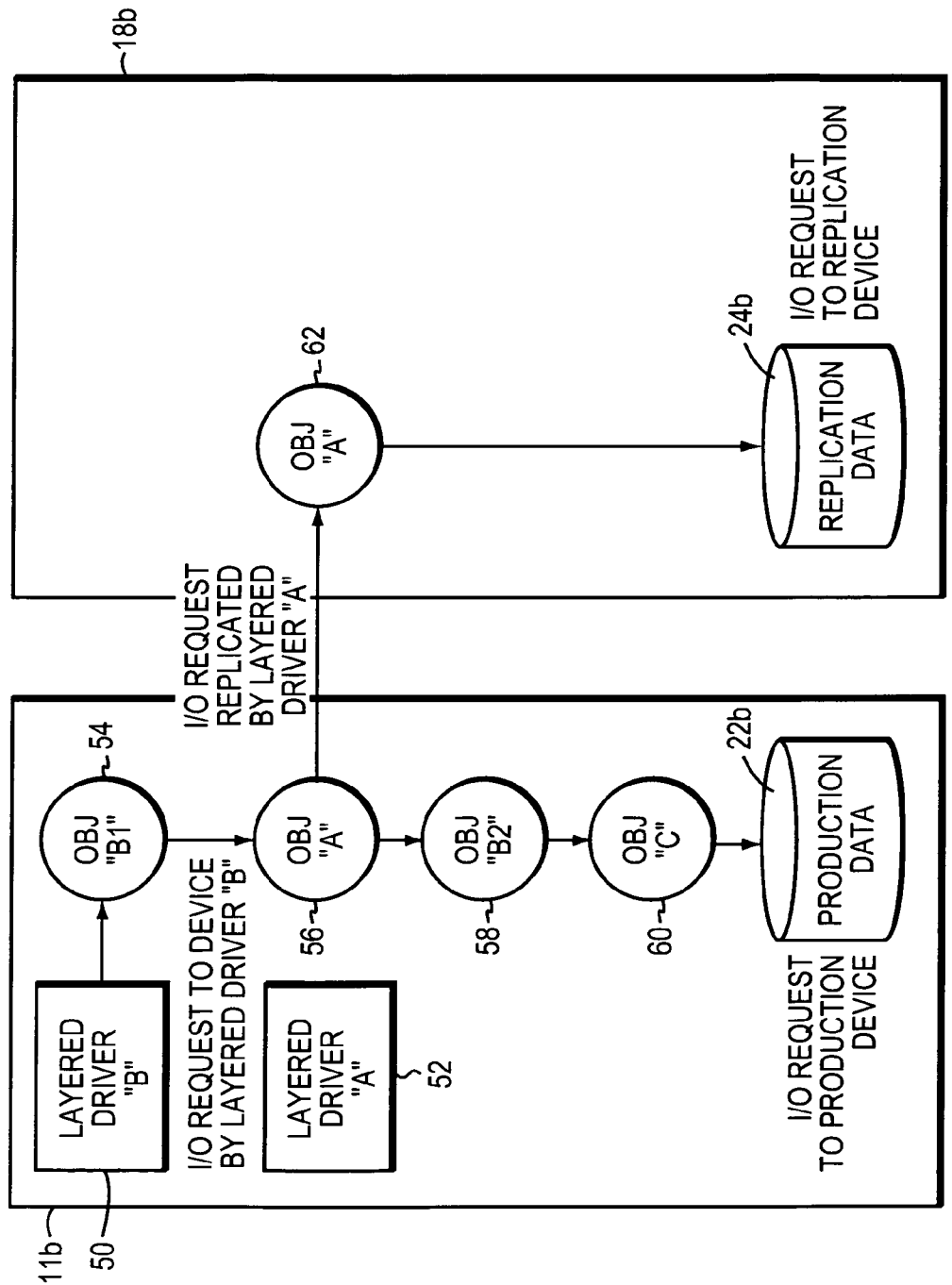
FIG. 3 shows another schematic block diagram including modules of the program logic of FIG. 1.

Referring to FIG. 3, the inventor has critically recognized that by strategically inserting multiple device objects within a device stack, layered drivers are able to resolve the issues created by the single device object model. Consider the example discussed with reference to FIG. 2, when Layered Driver "B" issues an IO-Request to the production device which could not be intercepted by Layered Driver "A". But if Layered Driver "B" 50 inserts multiple device objects 54 and 58 into the device stack, one above the Layered Driver "A" 52 device object 56 and one below, as embodied in the present invention, then that problem is well addressed. Layered Driver "B" initiates IO-Requests by sending them to the device object directly below device object "B1." Layered Driver "A" would be able to intercept these requests and perform any operations required for tracking or replicating the data before passing the request down the stack. In this model the "top" device object ("B1") 54 acts as the transmitter for IO-Requests initiated by Layered Driver "B" 50. The "lower" device object ("B2") 58 acts as the receiver by tracking the IO-Requests that come down the stack, from device object ("A") 56 and to device object ("C") 60 to process the I/O-Request to production storage device 22b. Device object 56 passes to device object 62 and the IO-Request is correctly replicated to replication data storage device 24b on target data storage system 18b. It should be noted that for convenience all device objects are shown on different data storage systems, but one skilled in the art will recognize that they could all be on the same data storage systems.

Figure 4A:
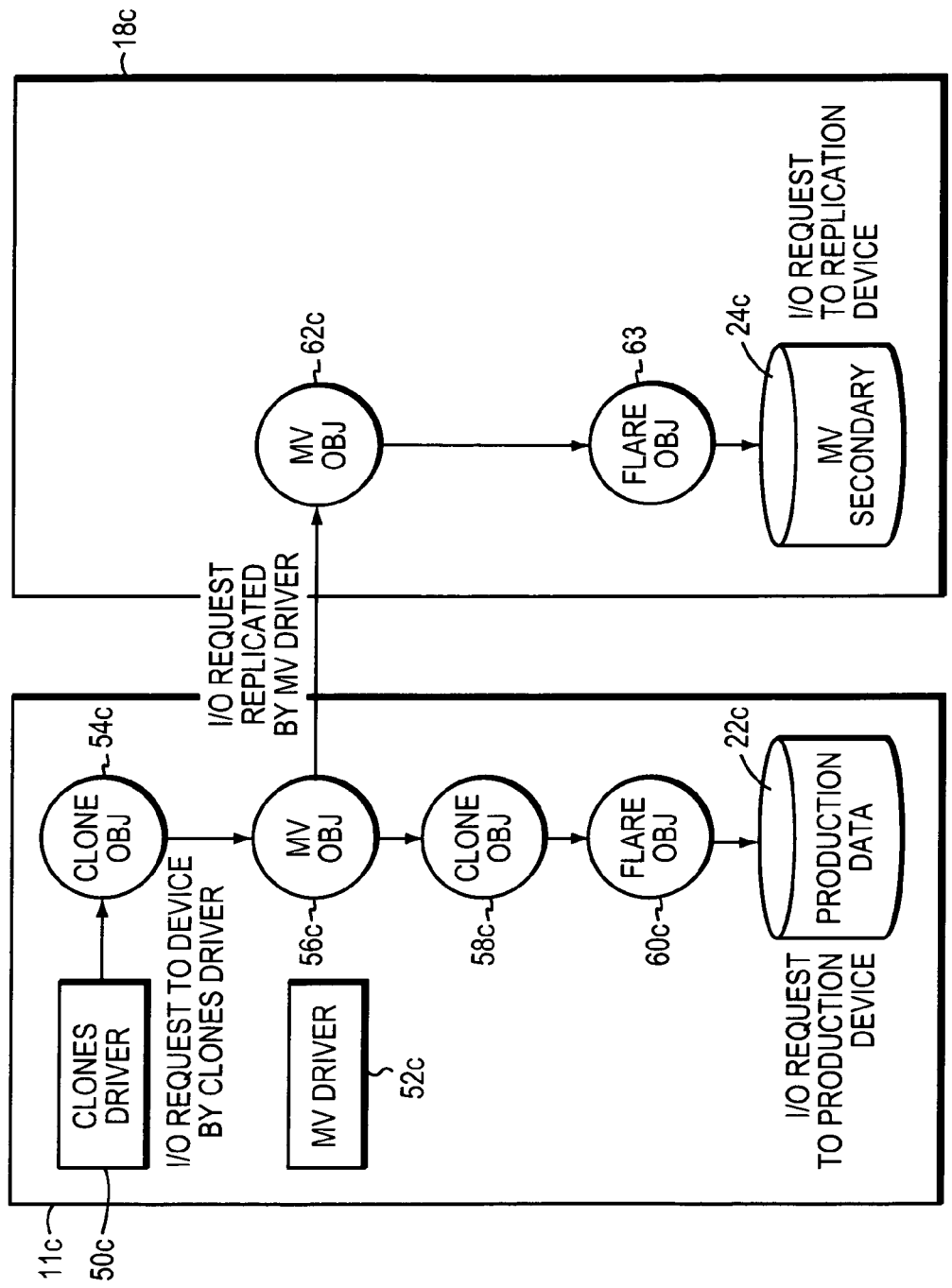
FIG. 4A shows another schematic block diagram including modules of the program logic of FIG. 1.
Figure 4B:
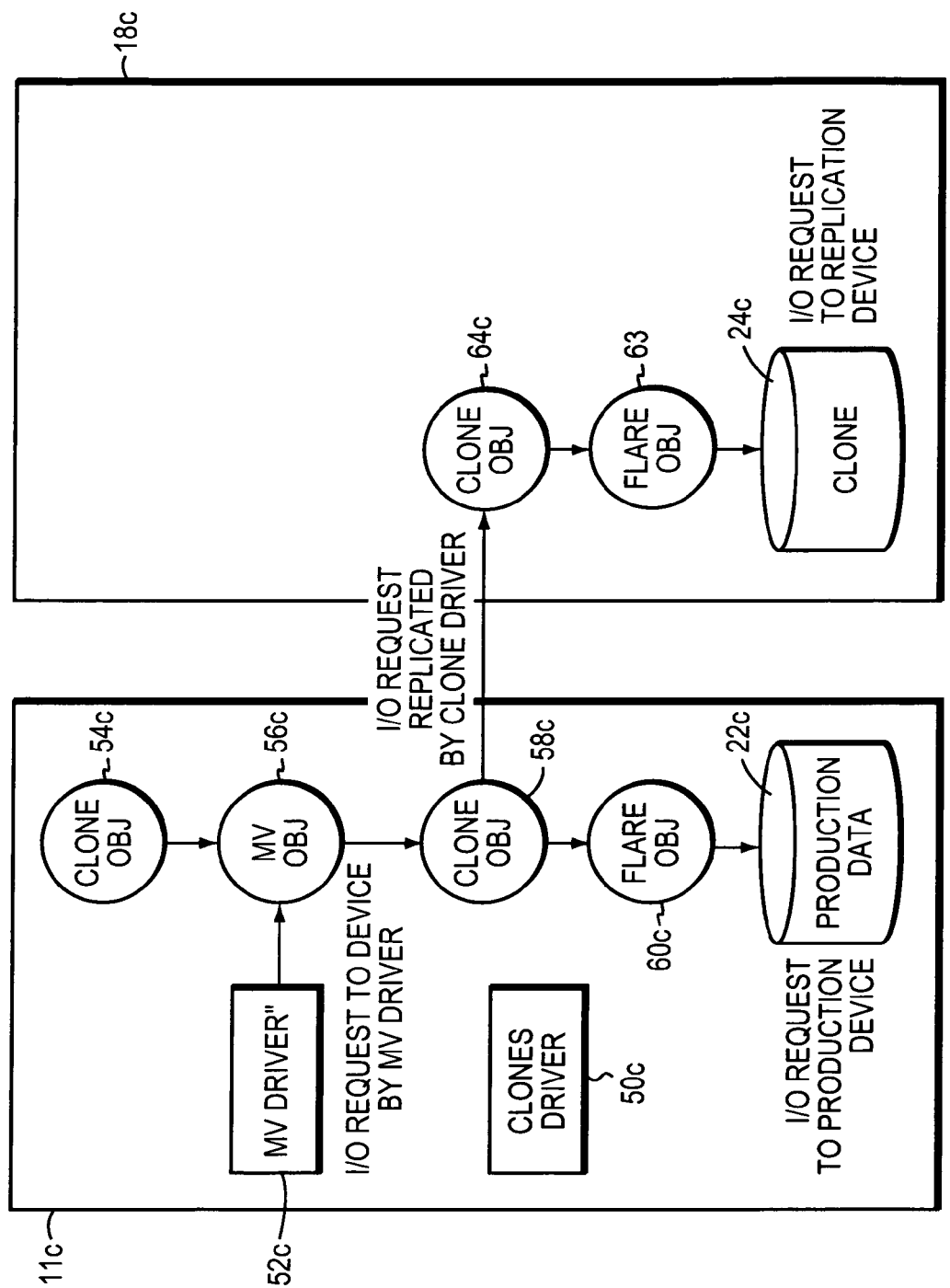
FIG. 4B shows another schematic block diagram including modules of the program logic of FIG. 1.

Referring to a preferred embodiment shown in FIGS. 4A and 4B an example case is shown for implementing the invention. By strategically inserting multiple device objects within a device stack, layered drivers are able to resolve the issues created by the single device object model. In the Example of FIG. 4A, a Clones driver 50c on System 11c issues an IO-Request to the Production Data Storage Device 22c. It can be intercepted in effect by the Mirrorview (MV) Driver 52c because the Clones driver inserts multiple device objects 54c and 58c into the device stack, one above the MV device object 56c and one below. The Clones driver initiates IO-Requests by sending them to the MV device object 56c (the initial request is consumed by the "upper" Clone device object and passed to the MV device object). The MV driver through its device object is able to intercept these requests and perform any operations required for tracking or replicating the data before passing the request down the stack, eventually to the FLARE Object 60c and to Data Storage Device 22c. In this model the "upper" Clone device object acts as the transmitter for IO-Requests initiated by the Clones Driver. The "lower" Clone device object acts as the receiver by tracking the IO-Requests that come down the stack. IO-Requests are replicated through MV object 62C down through FLARE Object 63 and down to Data Storage Device 24c (MV Secondary) on Target System 18C. FLARE is the preferred operating system for the preferred EMC Clariion Data Storage system, but one skilled in the art will recognize that another operating system could work with the invention.

Referring to another example case shown in FIG. 4B, the MirrorView Driver initiates IO-Requests by sending them to the "lower" Clone device object (which is consumed by the MV device object). The Clones driver is able to intercept these requests and perform any operations required for tracking or replicating the data before passing the request down the stack. Identically numbered elements in FIG. 4B to those in FIG. 4A are similar or identical and therefore not discussed. However, in this example, Clone device object 64c is a primary actor for sending the IO-Request to the device 24c (marked CLONE in this case because it is receiving data from the Clone object).

Figure 5:
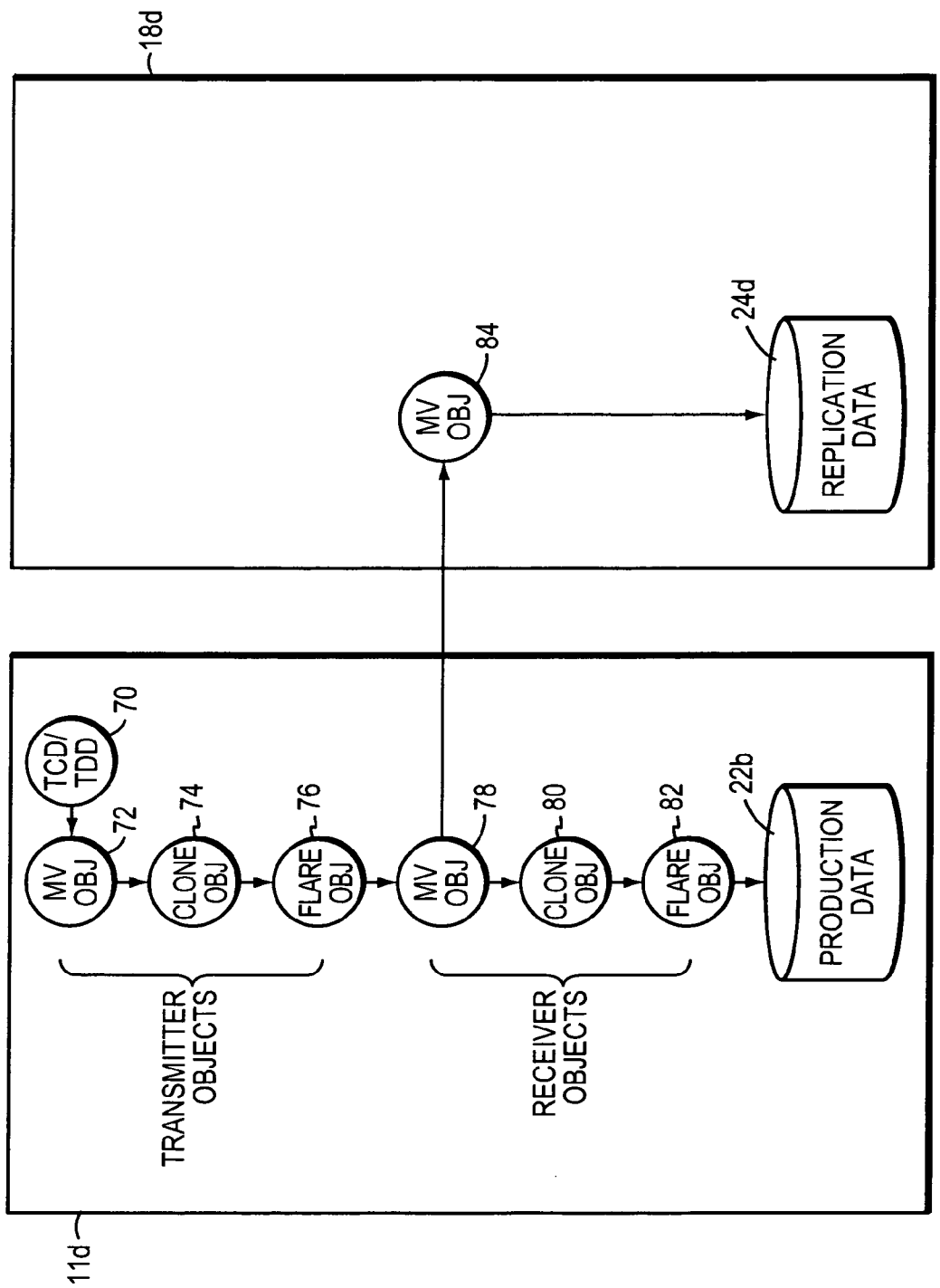
FIG. 5 shows another schematic block diagram including modules of the program logic of FIG. 1.

Reference is now made to FIG. 5 which shows a Transmitter and Receiver Object Model that is included in one preferred embodiment. In general, the inventor has recognized that a Layered driver can insert at least two device objects into the device stack, one as a Transmitter and one as a Receiver. In such a model, all Transmitter objects are inserted at the top of the device stack and Receiver objects are inserted at the bottom on production or source system 11d. In FIG. 5, Transmitter Objects include MV device object 72, Clone device object 74, and Flare device object 76, while Receiver Objects include MV device object 78, Clone device object 80, and Flare device object 82. In the Preferred embodiment, object 70 for Target Class Driver and Target Disk Driver (TCD/TDD) on the preferred Clariion is also included above both the Transmitter and Receiver Objects. Using this approach, each layered driver initiates IO-Requests for Production data storage device 22d by sending such requests to the device object directly below their associated Transmitter device object. This allows Layered Drivers to intercept, via their corresponding Receiver object all IO-Requests to a device by any other layered driver, and passed to the MV object 84 on Target system 18d, and replicated as Replication Data to storage device 24d.

Figure 6:
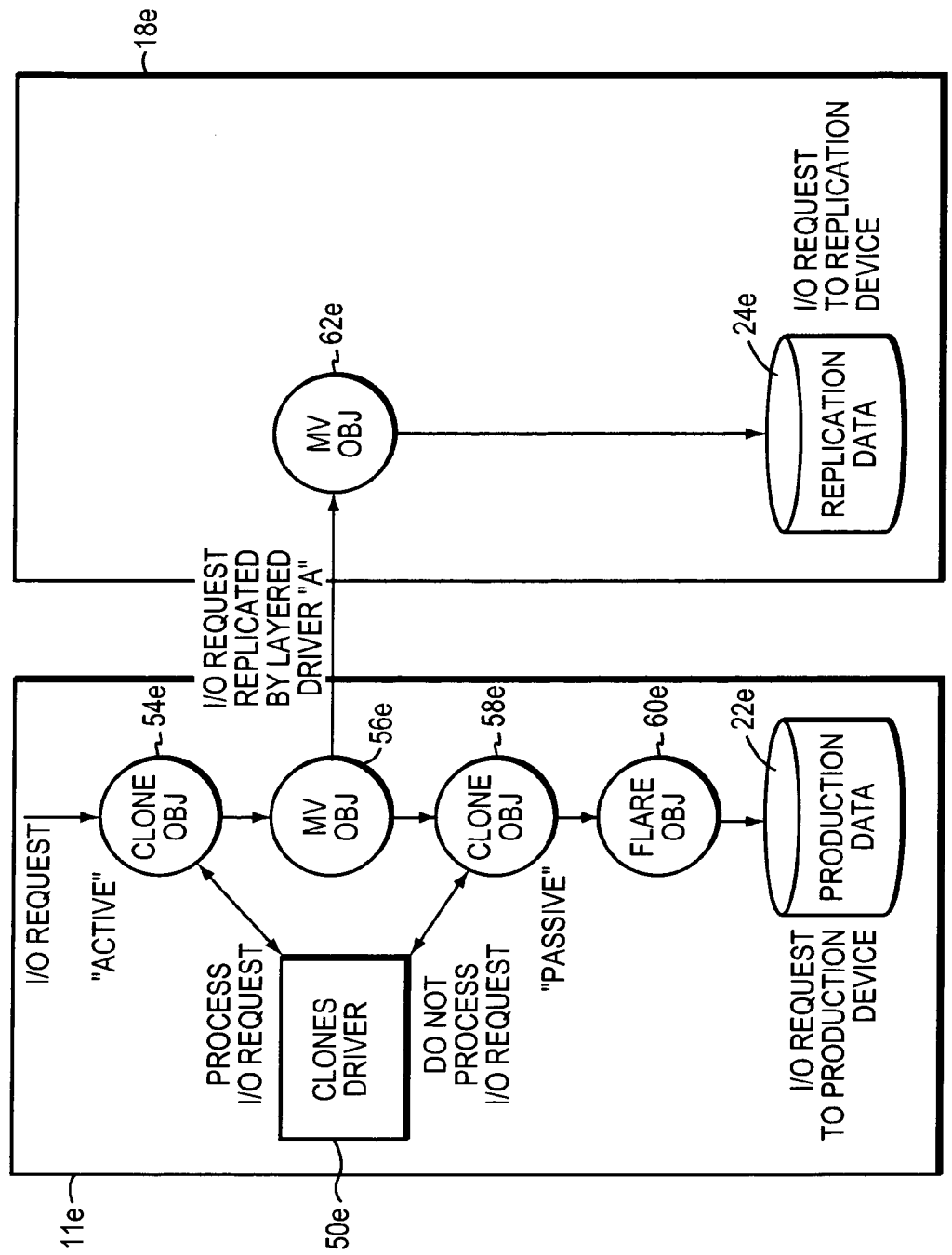
FIG. 6 shows another schematic block diagram including modules of the program logic of FIG. 1.

Referring to FIG. 6, when Layered Drivers insert more than one device object in a device stack, such as on source system 11e, a problem arises where the same IO-Request may be intercepted by a Layered Driver multiple times, and passed to MV object 62e on target system 18e. This could result in performance degradation or a SP failure. A mechanism can be implemented to prevent these IO-Requests from being processed by the driver more than once. One such mechanism that could be used in the Upper/Lower Device Object Model is an Active/Passive approach shown in FIG. 6. For this mechanism the Layered Driver assigns one of the device objects as Active and the other as Passive. For example, Clones Driver 50e assigns clone device object 54e as active, and clone device object 58e as passive for I/O request being processed down the stack to Production Data storage device 22e through Flare object 60e. MV object 56e replicates the IO-Request to the MV driver through MV object 62e down to Replication data storage device 24e. This assignment is done strategically based upon the desired behavior between the layered features. IO-Requests received by the Active device object will be processed by the associated layered driver while IO-Requests received by the Passive" device object will simply be passed down to the next device object in the stack. Layered Drivers can dynamically swap the role of its objects, making the mechanism more flexible.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a server, a first and second data storage volume, and production data being stored on the first data storage volume on a first data storage system, and a copy of the data denominated as the data copy being stored on the second data storage volume of a second data storage system, a method of handling Input/Output (IO)-Requests from the server to update the production data so that the data copy is consistent with the production data after processing the IO-Request, the method comprising the steps of:

(a) inserting on the first data storage system a first device object above a second device object and a third device object below the second device object to form a stack of layered device objects, wherein the first device object and the third device object are associated with a first device driver and the second device object is associated with a second device driver;

(b) the first device driver passing an IO-Request for the production copy on the first data storage system to the first device object;

(c) the second device driver associated with the second device object intercepting the and transmitting the IO-Request associated with the first device object to the third device object and to a fourth device object associated with the second device driver on the second data storage system;

(d) the second device driver associated with the fourth device object receiving and processing the associated IO-Request for the data copy on the second data storage system; and (e) the first device driver associated with the third device object receiving and processing the associated IO-Request for the production copy on the first data storage system such that when each IO-Request is processed the data on the data copy and the production data are consistent.

2. The method of claim 1, wherein the second device object tracks IO-Requests and replicates the IO-Request to the third device object and the fourth device object.

3. The method of claim 2, wherein the third device object tracks IO-Requests that are passed down the stack to it.

4. The method of claim 3, wherein the fourth device object tracks IO-Requests that are passed to it from the first data storage system.

5. The method of claim 1, wherein the IO-Request is an IO-write.

6. The method of claim 5, wherein the second device object tracks IO-Requests and replicates the IO-Request to the third device object and the fourth device object.

7. The method of claim 6, wherein the third device object tracks IO-Requests that are passed down the stack to it.

8. The method of claim 7, wherein the fourth device object tracks IO-Requests that are passed to it from the first data storage system.

9. A system for handling Input/Output (IO)-Requests in a data storage environment having a server, a first and second data storage volume, and production data being stored on the first data storage volume on a first data storage system, and a copy of the data denominated as the data copy being stored on the second data storage volume of a second data storage system, wherein IO-Requests to update production data are handled so that the data copy is consistent with the production data after processing the IO-Request, the system comprising (a) inserting on the first data storage system a first device object above a second device object and a third device object below the second device object to form a stack of layered device objects, wherein the first device object and the third device object are associated with a first device driver and the second device object is associated with a second device driver;

(b) the first device driver passing an IO-Request for the production copy on the first data storage system to the first device object;

(c) the second device driver associated with the second device object intercepting the and transmitting the IO-Request associated with the first device object to the third device object and to a fourth device object associated with the second device driver on the second data storage system;

(d) the second device driver associated with the fourth device object receiving and processing the associated IO-Request for the data copy on the second data storage system; and (e) the first device driver associated with the third device object receiving and processing the associated IO-Request for the production copy on the first data storage system such that when each IO-Request is processed the data on the data copy and the production data are consistent.

10. The system of claim 9, wherein the second device object tracks IO-Requests and replicates the IO-Request to the third device object and the fourth device object.

11. The system of claim 10, wherein the third device object tracks IO-Requests that are passed down the stack to it.

12. The system of claim 11, wherein the fourth device object tracks IO-Requests that are passed to it from the first data storage system.

13. The system of claim 9, wherein the IO-Request is an IO-write.

14. The system of claim 13, wherein the second device object tracks IO-Requests and replicates the IO-Request to the third device object and the fourth device object.

15. The system of claim 14, wherein the third device object tracks IO-Requests that are passed down the stack to it.

16. The system of claim 15, wherein the fourth device object tracks IO-Requests that are passed to it from the first data storage system.

17. A computer program product handling Input/Output (IO)-Requests in a data storage environment having a server, a first and second data storage volume, and production data being stored on the first data storage volume on a first data storage system, and a copy of the data denominated as the data copy being stored on the second data storage volume of a second data storage system, wherein IO-Requests to update production data are handled so that the data copy is consistent with the production data after processing the IO-Request, the computer-program product including computer-executable code on a tangible computer-readable storage medium for carrying out the steps of:

(a) inserting on the first data storage system a first device object above a second device object and a third device object below the second device object to form a stack of layered device objects, wherein the first device object and the third device object are associated with a first device driver and the second device object is associated with a second device driver;

(b) the first device driver passing an IO-Request for updating the production copy on the first data storage system to the first device object;

(c) the second device driver associated with the second device object intercepting the and transmitting the IO-Request associated with the first device object to the third device object and to a fourth device object associated with the second device driver on the second data storage system;

(d) the second device driver associated with the fourth device object receiving and processing the associated IO-Request for the data copy on the second data storage system; and (e) the first device driver associated with the third device object receiving and processing the associated IO-Request for the production copy on the first data storage system such that when each IO-Request is processed the data on the data copy and the production data are consistent.

* * * * *